US006892300B2

(12) United States Patent
Carroll et al.

(10) Patent No.: US 6,892,300 B2
(45) Date of Patent: May 10, 2005

(54) SECURE COMMUNICATION SYSTEM AND METHOD OF OPERATION FOR CONDUCTING ELECTRONIC COMMERCE USING REMOTE VAULT AGENTS INTERACTING WITH A VAULT CONTROLLER

(75) Inventors: Robert B. Carroll, Mt. Kisco, NY (US); Hamid Bacha, Great Falls, VA (US); Robert Briggs, Burke, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/338,364

(22) Filed: Jan. 8, 2003

(65) Prior Publication Data

US 2003/0105955 A1 Jun. 5, 2003

Related U.S. Application Data

(63) Continuation of application No. 09/223,764, filed on Dec. 31, 1998, now abandoned.
(60) Provisional application No. 60/087,984, filed on Jun. 4, 1998.

(51) Int. Cl.[7] .............................. H04L 9/00; G06F 15/16
(52) U.S. Cl. ....................... 713/156; 713/167; 713/168; 713/182; 713/201; 709/229
(58) Field of Search ................................. 713/156, 167, 713/168, 182, 201; 709/229, 201, 203

(56) References Cited

U.S. PATENT DOCUMENTS

| | | |
|---|---|---|
| 4,771,459 A | 9/1988 | Jansen |
| 4,868,877 A | 9/1989 | Fischer |
| 4,914,176 A | 4/1990 | Wang |
| 5,005,200 A | 4/1991 | Fischer |
| 5,218,637 A | 6/1993 | Angebaud et al. |
| 5,263,165 A | 11/1993 | Janis |
| 5,481,610 A | 1/1996 | Doiron et al. |
| 5,530,758 A | 6/1996 | Marino et al. |
| 5,629,980 A | 5/1997 | Stefik et al. |
| 5,640,501 A | 6/1997 | Turpin |
| 5,729,594 A | 3/1998 | Klingman |

(Continued)

Primary Examiner—Gilberto Barrón
Assistant Examiner—Kambiz Zand
(74) Attorney, Agent, or Firm—Paul J. Otterstedt

(57) ABSTRACT

A secure end-to-end communications system provides end users access to vault-based custom applications of an organization for purposes of conducting electronic commerce. The system includes a web-based vault controller running an application, e.g. a registrations application in a vault cryptographically linked to a database and a Certificate Management System (CMS) for generating digital certificates, and at least one remote vault agent coupled to the vault controller for providing vault-based custom applications to end users. An X.500 directory is coupled to the CMS and cryptographically linked to the remote vault agents for storing end user data. The remote vault agent is an application which comprises a collection of Application Programming Interfaces (APIs) which provide a secure interface to the vault controller; a Lightweight Data Access Protocol (LDAP) used to access the X.500 directory; a secure depositor coupled to vault-based custom applications of an organization. The secure depositor includes APIs to perform cryptographic functions in passing communications between vaults used by the vault agent and vaults used by the vault controller or vaults used by other vault agent applications and a secure depositor library which uses functions in the LDAP to access the X.500 directory. The remote vault agent accesses the web based vault controller on a non-web basis to enable remote custom applications to communicate securely with vault-based applications, such as a registration application that administers digital certificates.

25 Claims, 3 Drawing Sheets

U.S. PATENT DOCUMENTS

| | | |
|---|---|---|
| 5,742,683 A | 4/1998 | Lee et al. |
| 5,745,574 A | 4/1998 | Muftic |
| 5,790,677 A | 8/1998 | Fox et al. |
| 5,799,285 A | 8/1998 | Klingman |
| 5,850,442 A | 12/1998 | Muftic |
| 5,862,223 A * | 1/1999 | Walker et al. ............... 705/50 |
| 5,892,900 A * | 4/1999 | Ginter et al. ............... 713/200 |
| 6,598,167 B2 * | 7/2003 | Devine et al. ............. 713/201 |
| 6,606,798 B2 * | 8/2003 | El-Katcha et al. ............ 33/290 |
| 6,615,258 B1 * | 9/2003 | Barry et al. ................ 709/223 |

* cited by examiner

SECURE COMMUNICATION SYSTEM AND METHOD OF OPERATION FOR CONDUCTING ELECTRONIC COMMERCE USING REMOTE VAULT AGENTS INTERACTING WITH A VAULT CONTROLLER

CROSS REFERENCE TO RELATED APPLICATIONS

This application is a continuation of the U.S. application identified by Ser. No. 09/223,764 now abandoned, filed Dec. 31, 1998, the disclosure of which is incorporated by reference herein. The application identified by Ser. No. 09/223,764 now abandoned claims the benefit of the filing date of provisional application entitled "Secure Server Using Public Key Registration and Methods of Operation," Ser. No. 60/087,974, filed Jun. 4, 1998, assigned to the same assignee as that of the present invention, and fully incorporated herein.

This application is related to the following non-provisional applications, all assigned to the same assignee as that of the present invention and all fully incorporated herein by reference:

1. Ser. No. 08/980,022 now U.S. Pat. No. 6,105,131, filed Nov. 26, 1997 [SE9-97-005 (1963-7131-US1)], entitled "Secure Server and Method of Operation for a Distributed Information System", issued Aug. 14, 2000, now U.S. Pat. No. 6,105,131.

2. Ser. No. 09/223,765, filed Dec. 31, 1998 [SE9-98-017 (1963-7256)], entitled "Vault Controller Supervisor and Method of Operation for Managing Multiple Independent Vault Processes & Browser Sessions for Users in an Electronic Business System."

3. Ser. No. 09/223,834 now U.S. Pat. No. 6,438,690, filed Dec. 31, 1998 [SE9-98-022 (1963-7261)], entitled "Vault Controller Based Registration Application Serving Web Based Registration Authorities and End Users for Conducting Electronic Commerce in a Secure End-to-End Distributed Information System."

BACKGROUND OF THE INVENTION

1. Field of the Invention

This invention relates to secure end to end communications systems. More particularly, the invention relates to a system and method of operation for conducting electronic commerce using remote vault agents directly interacting with a web based vault controller.

2. Background Discussion

Traditionally, organizations, such as retailers, banks, and insurance companies in conducting electronic commerce, register their customers or users and control their access to organization software applications with a user identification (user ID) and password. The user ID and password establish a user identity for accessing secure information. The password is the "virtual key" that authenticates a user. However, a password does not provide the necessary security needed for electronic commerce. Passwords have the following limitations:

(a) Can be compromised during log-on by on-lookers;

(b) Can be easily intercepted on the Internet if the transaction is not secured with a secure web protocol, such as a secure socket layer (SSL);

(c) Authenticate a user to a host but not a host to a user;

(d) Can be discovered using automatic "trial and error" techniques;

(e) Do not protect transmitted information; and (f) Do not ensure the access is limited to authorized entities and applications.

A new approach to conducting electronic commerce on secure end to end communication systems is described in the cross-reference application. In this approach, digital keys have replaced user identification/password pairs. Public key cryptography uses mathematically related public/private key pairs. Only the private key can decrypt the information the public key has encrypted. Only the public key can verify a signature performed with a private key. The public key can be made available to anyone. The private key is kept secret by the holder.

Just as digital authentication is replacing user identification/password pairs in electronic commerce, digital signatures are replacing physical signatures. A digital signature is a coded message affixed to a document or data that helps guarantee the identity of the sender, thereby providing a greater level of security than physical signatures. A digital signature identifies the sender because only the sender's private key can create the signature. The key also helps ensure the content of the signed message cannot be altered without the recipient being able to discover that the message has been altered. Digital certificates are replacing their physical counterpart—hard copy credentials. Digital certificates issued by a certification authority vouch for (or certify) the key of an individual, software application, organization or business. The certificate performs a role similar to that of a driver's license or medical diploma—the certificate certifies that the bearer of the corresponding private key is authorized (by an organization) to conduct certain activities for that organization.

However, the life cycle of digital certificates is similar to that of physical certificates. Digital certificates are issued after authorization in which a user is given the right to use a digital certificate for a specific amount of time. The certificate may be temporarily suspended when a user reports a lost certificate and re-instated at a later time. The certificate may also be revoked by the organization. Finally, digital certificates expire and for secure end-to-end communications in electronic business, the certificate must be validated to determine whether the certificate has expired, been revoked, or suspended.

Digital certificates are issued through authorized registrars known as Registration Authorities (RAs). The RAs determine whether the applicant should be authorized to access secure applications or services and set in motion a process to issue a certificate. A Certification Authority (CA) issues the digital certificate after approval by the Registration Authority. The certificate is a binding between a public key and an identity, i.e., a person, organization, or computer device. The certificate includes a subject name; issuer name; public key; validity period; unique serial number; and CA digital signature. A CA guarantee's the authenticity of the certificate through its digital signature. The certificate may be revoked at any time. The serial numbers of the revoked certificates are added to a Certification Revoked List (CRL) published in an X.500 Directory based on a standard defined by the International Telecommunications Union (ITU).

A secure operating environment is required by RAs and end users in conducting the registration process for the issuance of digital certificates, which uniquely identify end users. A preferred secures operating environment employs "Vault Technology", described in the above-mentioned cross-related application, Ser. No. 08/980,022 now U.S. Pat. No. 6,105,131, filed Jun. 13, 1997. Briefly stated, "Vault Technology" provides a secure environment in a web server using a vault controller, which provides security from other processes running on the same server. The vault controller provides secure areas as personal storage vaults to which only the owner has an access key. System operators, administrators and others cannot get to stored information or secure processes in such personal vaults. Combined with the well-known Secure Sockets Layer (SSL) protocol, the vault controller enables secure transactions that may require multiple sessions using personal vaults. The personal vault is linked to a particular UNIX account that is linked to a user with a specific vault access certificate. The content of the vault is always encrypted. The vault contains an encryption key pair and signing key pair, both of which are protected. Each vault has a unique distinguished name in an X.500 directory that provides storage for specific items essential to a Public Key Infrastructure (PKI).

To enhance and facilitate the conduct of electronic commerce for both end users and organizations providing vault-based custom applications, a need exists for a remote vault agent, preferably under the control of the business organization, to directly interact with a vault controller on a non-web basis and in a secure end to end manner.

SUMMARY OF INVENTION

An object of the invention is a remote vault agent providing an improved system and method for organizations to interact directly with vault-based custom applications deployed with a vault controller.

Another object is a remote agent and method of operation serving an organization and directly interacting with a web-based vault controller in registering end users for conducting electronic commerce using secure vault-based custom applications.

Another object is a remote vault agent serving an organization directly interacting with a web-based vault controller in issuing, renewing, revoking digital certificates for end users in conducting electronic commerce with secure vault-based custom applications of the organization.

Another object is a remote vault agent and method of operation for serving an organization directly interacting with a web-based vault controller to securely encrypts, sign and exchange data with vaults.

Another object is a remote vault agent and method of operation, which performs cryptographic functions in transferring data between vault agents and vaults.

These and other objects, features and advantages are achieved in a secure end to end communications system including a web based vault controller running a registration application and cryptographically linked to a database and a Certificate Management System for generating digital certificates. A remote vault agent serving an organization provides end users access to vault-based custom applications of an organization for conducting electronic commerce. An X.500 directory is coupled to the CMS and cryptographically linked to the remote vault agents. The remote vault agent is an application which comprises a collection of Application Programming Interfaces (APIs) which provide a secure interface to the vault controller; a secure depositor using vault APIs to perform cryptographic functions in passing communications between vaults used by the vault agent and vaults used by the vault controller or vaults used by other vault agent applications, and a Lightweight Data Access Protocol (LDAP) used to access the X.500 directory. In a preferred embodiment, the remote vault agent directly accesses the web based vault controller to interact with the registration application to obtain digital certificates which a registered user must present when attempting to access vault-protected services in the custom application. Certificates can be issued, revoked, renewed, suspended and resumed by the remote vault agent without access to the web server to which the vault controller is linked.

DESCRIPTION OF THE DRAWING

The invention will be further understood from the following detailed description of a preferred embodiment taken in conjunction with an appended drawing, in which.

DESCRIPTION OF PREFERRED EMBODIMENT

Figure 1:
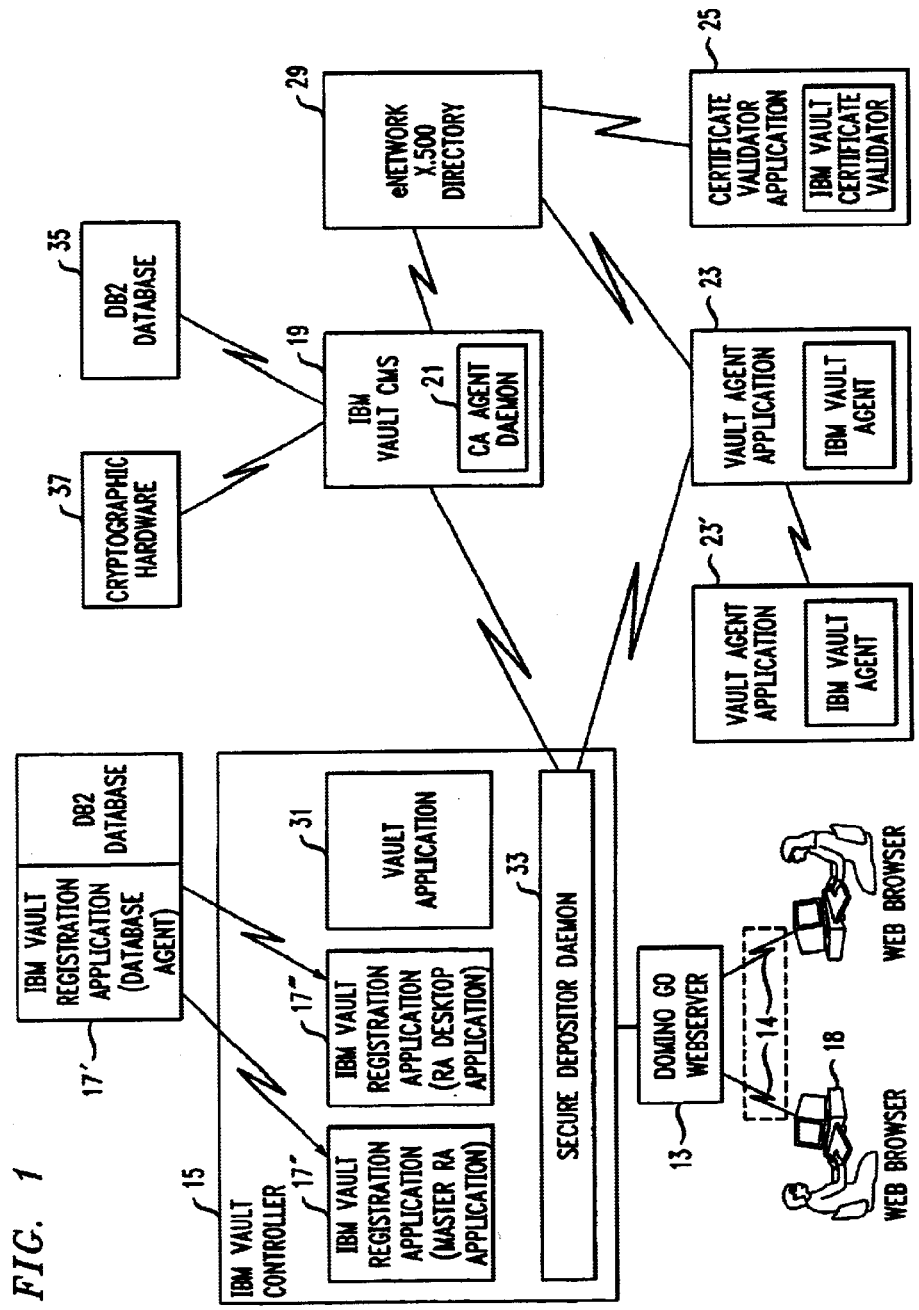
FIG. 1 is a representation of the web-based vault controller interacting with a remote vault agent and employing the principles of the present invention.

FIG. 1 shows a web-based vault controller 15 and remote vault agents 23, 23$^1$, which interacts directly and not through a web server 13 with vault based applications. Users 18 coupled to the web server 13 through the network 14 using a browser may access the vault controller where custom vault applications may interact with remote vault agents. The vault controller is more fully described in copending application, Ser. No. 09/223,765, filed Dec. 31, 1998 (SE9-98-017), assigned to the assignee of the present invention and filly incorporated herein by reference. The vault controller discloses a vault registration application 17 divided into an end user registration application 17', a Registration Authority (RA) or desktop application 17", and a master RA application 17'''. The registration application performs the task of issuing certificates on behalf of the user and desktop applications 17' and 17" respectively, and,is more fully described in copending application, Ser. No. 09/223,834 now U.S. Pat. No. 6,438,690, filed Dec. 31, 1998 (SE9-98-022), assigned to the same assignee as that of the present invention and fully incorporated herein by reference. A vault certificate validator 25 provides functions for validating end user certificates from remote locations. The certificates can be examined for validity period, which certification authority issued the certificate; whether the certificate was revoked, etc.

The vault controller 15 further includes vault process applications 31, which run in the vaults on the vault controller and are activated when a user presents a vault access certificate.

A secure deposit daemon 33 is responsible for secure communications between the vaults. When a message is sent from one vault to another, the depositor ensures the message is encrypted and signed before placing it in the queue of a recipient vault. When retrieving a message, the depositor is responsible for decrypting and verifying the signature before returning the message content. A Certificate Management System (CMS) 19 is outside the vault controller and is accessed by a Certification Authority Agent Daemon 21. The CMS 19 is cryptographically linked to the secure depositor 33 and to a database 35. Optionally, the CMS may be linked to cryptographic hardware 37 for purpose of signing certificates for users. The vault agent applications are cryptographically linked to the CMS 19 and to the X.500 Directory 29. Likewise the certificate validator application 25 is linked to the Directory 29.

Figure 2:
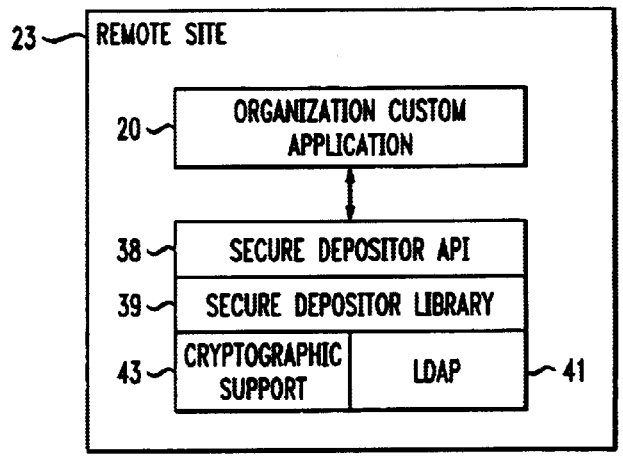
FIG. 2 shows the structure of the remote vault agent in FIG. 1.

In FIG. 2, the structure of a remote vault agent application 23 comprises an organization's custom application 20, which sits directly atop a secure depositor Application Programming Interface (API) 38. The APIs (not shown) are used to: encrypt and sign a buffer of arbitrary length containing text or binary data and store signed and encrypted data in recipients vault message queue; verify the sender's signature, and decrypt the data on the receiving side. The interface uses a secure deposit library 39 to access the X.500 Directory using a Lightweight Directory Access Protocol (LDAP) 41 and a Cryptographic Support Library 43 to perform encryption, decryption, signing and verification functions for the application, the cryptographic keys used by these functions are located in encrypted form in a file. A password must be supplied at "start up" to allow the vault agent to access the private keys. The secure depositor uses an algorithm to custom map a Distinguished Name (DN) of the vault holder to the Distinguished Name of the vault using information stored in the X.500 directory under the holder Distinguished Name. Information about the location of the recipient vault or vault agent and its cryptographic strength is also stored in the X.500 Directory.

The main function of the remote vault agent is to enable organizations to securely exchange data between applications running in remote vaults and applications running in vaults under the vault controller. The vault agent incorporates a subset of the vault controller's application programming interface which enable the vault agent to send messages and receive messages on a non-web basis to/from vault processes running on the vault controller. Messages are signed and encrypted before transmission. A TCP/IP socket connection is used to transmit messages from the secure depositor process to a secure depositor daemon located in the vault controller.

The secure depositor takes the DN of a target vault owner as an argument and accesses the appropriate record from the X.500 Directory to retrieve an attribute. The attribute contains a signed message which is a combination of a vault owner Distinguished Name; vault ID or vault name; vault IP address; vault daemon port number and vault encryption level. The vault ID is concatenated with a subset of the vault owner Distinguished Name to form a complete Distinguished Name for the vault. This methodology facilitates the detection of any modification or replacement of the information used to map to the target vault. When the secure depositor retrieves the signed message from the user DN record, the depositor extracts the vault name from the signed message. The secure depositor then retrieves the encryption certificate from the X.500 directory and encrypts the message to the target vault. Combining the vault owner DN and the vault name in the signed message provides two benefits. The first benefit is that the secure depositor can verify that the vault name is actually bound to the user DN and this binding has not been modified. The second benefit is that if someone has replaced the signed message in the user DN record with that from another record, the user DN in the signed message will not match the DN in the X.500 record. The secure depositor will then reject the encryption attempt.

Figure 3:
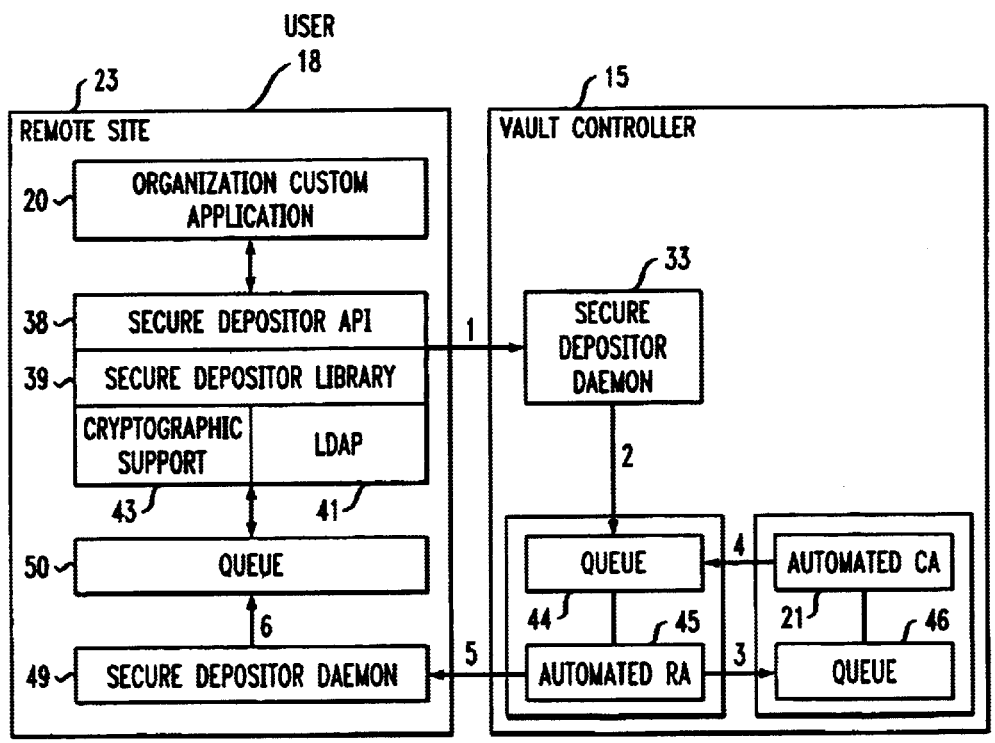
FIG. 3 is a representation of a remote vault agent of FIG. 1 interacting with a vault process.

FIG. 3 shows an example of the interaction between a remote vault agent 23 and a vault process in the vault controller 15 in responding to an end user request for a digital certificate. In this case, the vault process is an automated Registration Authority 45 that accepts requests including those to obtain or renew certificates. The automated registration authority, in turn, communicates with a local vault process known as a certification authority agent 21 which deals with the certification authority to carry out the registration authority requests using a process, as follows:

In step 1, the vault agent 23 sends a request to an automated registration authority 45 in the vault controller. The message is handled by the secure depositor daemon 33.

In step 2, the daemon stores the request in a queue 44 serving the automated Registration Authority 45.

In step 3, the automated registration authority retrieves the message, verifies that the sender is authorized to perform the requested action, then forwards a new message to the certification authority agent 21 via queue 46.

In step 4, the Certification Authority (CA) agent 21 signs the certificate—through the certification agent—and returns it to the automated Registration Authority.

In step 5, the automated Registration Authority sends the certificate back to the remote vault agent by way of the secure depositor daemon 49 which is then placed in the queue 50 of the vault agent. The remote vault agent then delivers the certificate in step 6 to the appropriate user 18 accessing the remote vault agent 23.

Figure 4:
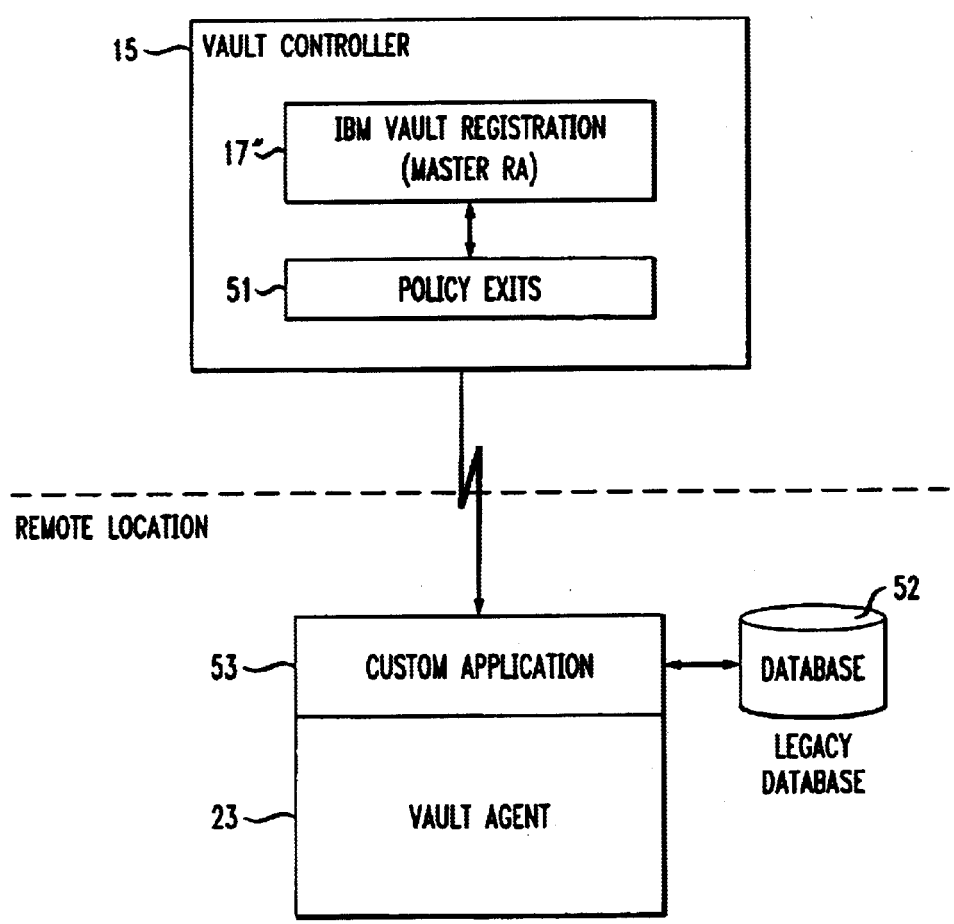
FIG. 4 is a representation of a remote vault agent of FIG. 1 interacting with another vault process.

FIG. 4 shows another embodiment of the remote vault agent 23 in servicing applications running at a customer's location. In this case, a custom application running at the remote agent location interacts with a policy exit(s) of the Registration Application 17" running in the vault controller 15. Policy exits are described in Ser. No. 09/223,834 (SE9-98-022), supra. Briefly, policy exits are customer supplied programs which are invoked by the Registration Application 17" during the processing of certificate requests. However, policy exits can be written to perform a variety of other tasks, e.g. providing applications with additional information from a legacy database 52 (data accumulated by the customer over the years) or performing additional reviews of actions taken in approving or rejecting requests processed by the Registration Application. In this case, the policy exit interacts with a remote vault agent to obtain additional information about the applicant from a remote site.

Summarizing, a remote vault agent directly interacts with a vault controller on a non-web basis and in a secure end-to-end manner for performing various tasks in connection with applications running in the remote vault agent and/or in the vault controller, among which is the issuance of digital certificates to end users authorized to have access to vault-based custom applications.

While the invention has been shown and described in the preferred embodiment, various modifications may be made therein without departing from the spirit and scope of the invention as defined in the appended claims, in which:

What is claimed is:

1. Apparatus for use in establishing a secure exchange of information between an end user and a secure server in a distributed network environment, the apparatus comprising:

An agent accessible by the end user and remote from the secure server, wherein the secure server enables storage of data in one or more storage areas accessible by one or more authenticated users and enables execution of at least one process, the remote agent operative to: (i) interact with the at least one process, enabled by said secure server, on a non-network basis; and (ii) obtain data associated with the at least one process for use by the end user in establishing a secure exchange of information between the end user and the secure server.

2. The apparatus of claim 1, wherein the at least one process comprises a certificate management application and the data obtained by the agent comprises a digital certificate.

3. The apparatus of claim 2, wherein, in accordance with the certificate management application, the digital certificate may be at least one of issued, revoked, suspended and resumed.

4. The apparatus of claim 2, wherein, in accordance with the digital certificate, the remote agent is further operative to provide the end user access to one or more electronic commerce-based applications enabled by the secure server.

5. The apparatus of claim 1, wherein the one or more storage areas comprise one or more vaults.

6. The apparatus of claim 5, wherein the secure server has associated therewith a vault controller for controlling the one or more vaults.

7. The apparatus of claim 6, wherein the remote agent comprises an application programming interface for accessing functions associated with the remote agent.

8. The apparatus of claim 6, wherein the remote agent comprises one or more cryptographic functions for at least one of encrypting, decrypting, signing and verifying data associated with communications between the remote agent and the vault controller.

9. The apparatus of claim 6, wherein the remote agent is operative to communicate with a remote directory to obtain information in accordance with a lightweight directory access protocol (LDAP) in order to access the one or more vaults controlled by the vault controller.

10. The apparatus of claim 9, wherein the obtained information comprises identifying information used to map to the vault to be accessed.

11. The apparatus of claim 10, wherein the remote agent utilizes at least a portion of the identifying information to perform a vault owner/vault identifier verification operation.

12. The apparatus of claim 6, wherein the remote agent is further operative to provide an application executing in accordance with the vault controller with information associated with the end user stored at a remote site.

13. A method for use in establishing a secure exchange of information between an end user and a secure server in a distributed network environment, the method comprising the steps of:

in accordance with an agent accessible by the end user and remote from the secure server, wherein the secure server enables storage of data in one or more storage areas accessible by one or more authenticated users and enables execution of at least one process, the remote agent:

interacting with the at least one process, enabled by said secure server, on a non-network basis; and obtaining data associated with the at least one process for use by the end user in establishing a secure exchange of information between the end user and the secure server.

14. The method of claim 13, wherein the at least one process comprises a certificate management application and the data obtained by the agent comprises a digital certificate.

15. The method of claim 14, wherein, in accordance with the certificate management application, the digital certificate may be at least one of issued, revoked, suspended and resumed.

16. The method of claim 14, wherein, in accordance with the digital certificate, the remote agent provides the end user access to one or more electronic commerce-based applications enabled by the secure server.

17. The method of claim 13, wherein the one or more storage areas comprise one or more vaults.

18. The method of claim 17, wherein the secure server has associated therewith a vault controller for controlling the one or more vaults.

19. The method of claim 18, wherein the remote agent comprises an application programming interface for accessing functions associated with the remote agent.

20. The method of claim 18, wherein the remote agent comprises one or more cryptographic functions for at least one of encrypting, decrypting, signing and verifying data associated with communications between the remote agent and the vault controller.

21. The method of claim 18, wherein the remote agent communicates with a remote directory to obtain information in accordance with a lightweight directory access protocol in order to access the one or more vaults controlled by the vault controller.

22. The method of claim 21, wherein the obtained information comprises identifying information used to map to the vault to be accessed.

23. The method of claim 22, wherein the remote agent utilizes at least a portion of the identifying information to perform a vault owner/vault identifier verification operation.

24. The method of claim 18, wherein the remote agent provides an application executing in accordance with the vault controller with information associated with the end user stored at a remote site.

25. An article of manufacture for use in establishing a secure exchange of information between an end user and a secure server in a distributed network environment, comprising a machine readable medium containing one or more programs which when executed implement the steps of:

in accordance with an agent accessible by the end user and remote from the secure server, wherein the secure server enables storage of data in one or more storage areas accessible by one or more authenticated users and enables execution of at least one process, the remote agent:

interacting with the at least one process, enabled by said secure server, on a non-network basis; and obtaining data associated with the at least one process for use by the end user in establishing a secure exchange of information between the end user and the secure server.

* * * * *